United States Patent [19]

Stahl

[11] Patent Number: 4,801,244
[45] Date of Patent: Jan. 31, 1989

[54] DEVICE
[75] Inventor: Peter Stahl, Enskede, Sweden
[73] Assignee: Flygt AB, Solna, Sweden
[21] Appl. No.: 58,098
[22] Filed: Jun. 4, 1987
[30] Foreign Application Priority Data Jun. 27, 1986 [SE] Sweden .................... 8602873

[51] Int. Cl.[4] .................. B63H 1/14; F16J 15/447
[52] U.S. Cl. .................... 416/146 R; 277/32; 277/53; 277/56; 277/68; 277/70; 277/133; 415/121 B; 416/174
[58] Field of Search ............ 277/134, 53, 23, 24, 277/67, 68, 133, 54, 55, 56, 57, 58, 32, 70, 71; 415/111, 112, 113, 170 B, 121 B; 416/174, 146 R

[56] References Cited

U.S. PATENT DOCUMENTS

| 2,281,905 | 5/1942 | Young | 277/56 |
| 2,329,990 | 9/1943 | Hornschuch | 277/134 |
| 3,147,013 | 9/1964 | Tracy | 277/67 |
| 3,273,906 | 9/1966 | Pennington | 277/134 |
| 3,371,720 | 3/1968 | Blanchard, Jr. | 416/146 R |
| 3,558,238 | 1/1971 | Van Herpt | 277/53 X |
| 3,953,146 | 4/1976 | Sowards | 415/121 B |
| 4,236,872 | 12/1980 | Metcalf | 416/146 R |

FOREIGN PATENT DOCUMENTS

| 406735 | 11/1938 | Fed. Rep. of Germany | 277/56 |
| 465087 | 4/1937 | United Kingdom | 277/56 |

Primary Examiner—Allan N. Shoap
Attorney, Agent, or Firm—Menotti J. Lombardi

[57] ABSTRACT

A device in a submersible pump or mixer prevents solid bodies from entering a housing containing a mechanical seal. The device has a helically formed groove so directed, that pollutant material is fed in a direction away from the mechanical seal, and the device has a cutting means to cut the pollutant material.

4 Claims, 3 Drawing Sheets

DEVICE

BACKGROUND OF THE INVENTION

The invention concerns a device for preventing solid bodies from entering areas between two rotating machine parts, relative to each other.

Some types of machines such as electrically driven pumps and mixers are provided with one or several seals, usually mechanical seals, between the hydraulic unit and the driving unit. The seal prevents liquid from going along the driving shaft into the driving unit and cause damage in the latter.

A mechanical seal consists of two seal rings, one rotating and one non-rotating, which are pressed towards each other. The seal is lubricated and cooled by the surrounding medium and are exposed to severe strain, especially if the medium contains large amounts of solid bodies or pollutants. Because of the high pressure, these solid bodies may enter between the seal surfaces and cause damage, thus creating a leakage.

In order to provide the mechanical seal with as good an operating condition as possible, a pure liquid, water or even a gas may be brought to the seal area. The polluted liquid is then held back from the seal surfaces and the risk of damage decreases.

The described method has however certain disadvantages, in that the pure medium which is fed continuously costs money and may under certain circumstances cause harmful dilution of the surrounding medium.

SUMMARY OF THE INVENTION

An object of the invention is to eliminate the need for a flush water or fluid.

Another object of the invention is to provide for a device which protects the housing area where the mechanical seal is situated.

According to the broader aspects of the invention, the device comprises counter-directed thread profiles or helically formed grooves and a cutting means.

A feature of the invention is that the device has helically formed grooves so directed, that pollutant material is fed away from the mechanical seal area and the cutting means is arranged to cut elongated fibers or materials.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
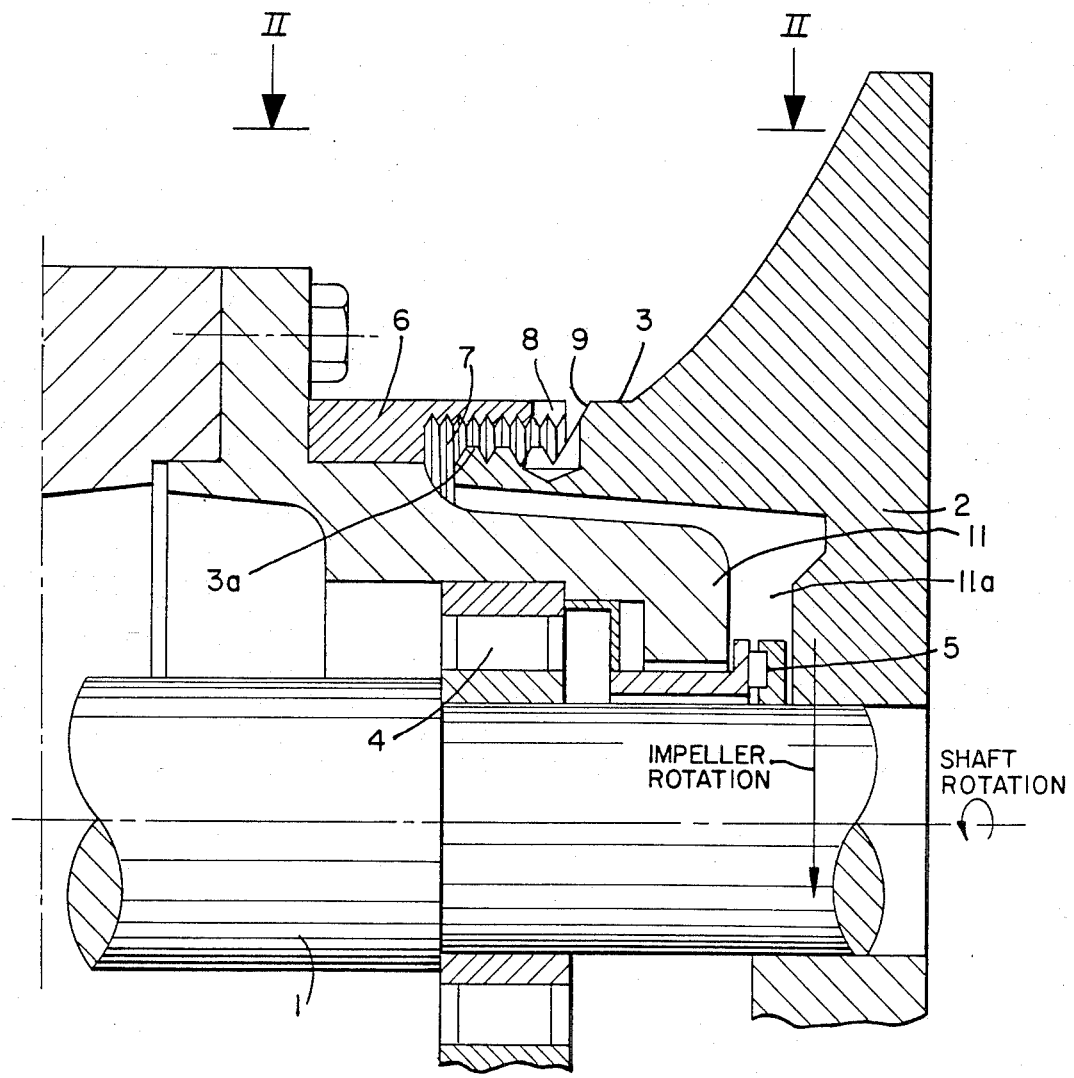
FIG. 1 shows a sectional view of a part of a mixer unit provided with the device according to the invention.
Figure 2:
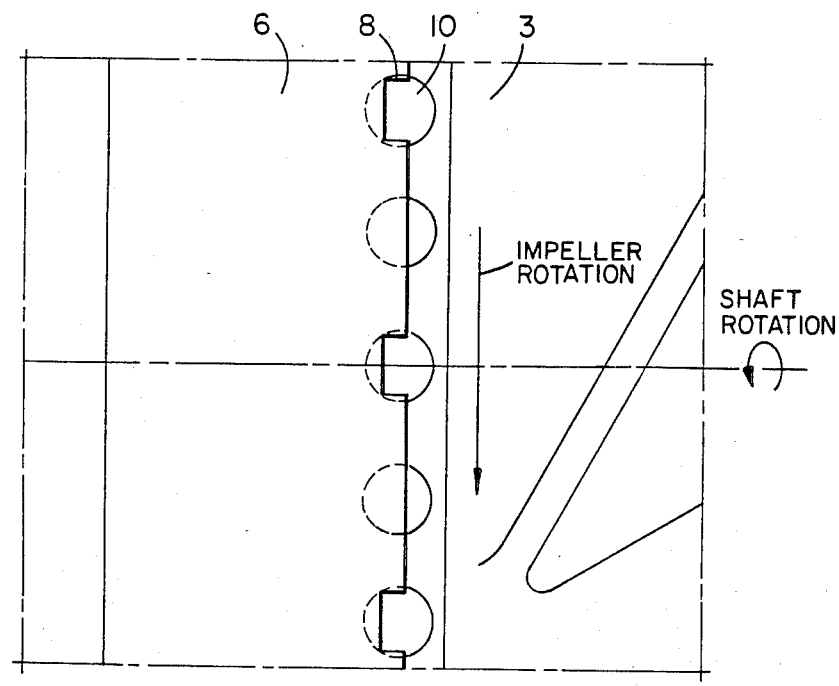
FIG. 2 shows a part of the device seen from direction of arrows 2—2 in FIG. 1.
Figure 3:
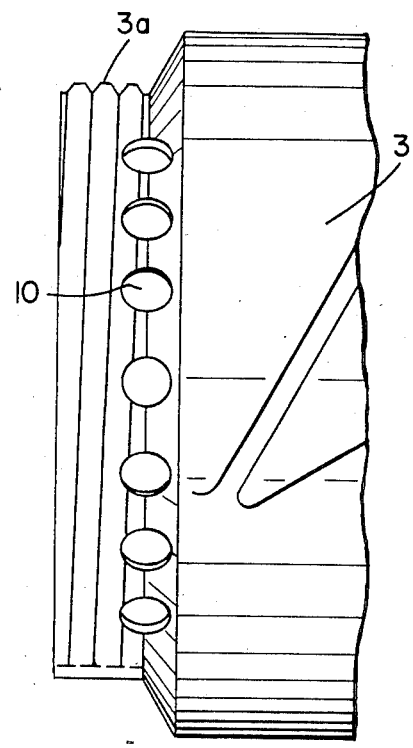
FIGS. 3 and 4 shows the main parts of the device in more detail.
Figure 4:
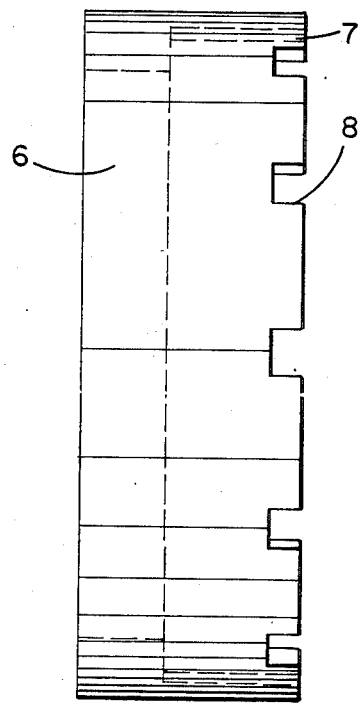

Referring to the drawings, there is shown a rotary shaft 1, and an impeller 2 mounted on the shaft. The impeller has a hub portion 3. The arrangement includes a bearing 4, a mechanical seal 5, a socket member 6, having a helically formed groove 7 and cutting means 8. Hub portion 3 has a chamfered surface 9 and holes 10. The seal housing is indicated as 11, and the housing area around seal 5 is indicated as 11a.

When the mixer operates vortexes are created under pressure in certain areas at the impeller blades, especially in front of the blades in the direction of the flow. This phenomena means that pollutant material in the liquid such as fibers, tend to collect in these areas. They might then enter the area 11a containing the mechanical seal 5 and cause damage, or they might wind up around hub 3 creating vibrations and poor efficiency.

According to the invention a non-rotating socket member or ring 6 is positioned on housing 11 and surrounds a portion of the hub 3. Hub 3 and/or the socket member 6 are provided with a number of helically formed grooves 3a, 7 with counter-directed thread profiles on their respective inner and outer peripheries. The grooves 3a, 7 are spaced arranged so that when the hub 3 rotates, a feeding action is created in the space between grooves 3a, 7 in the direction of the opening, toward the chamfer surface 9 and the rear-ward portion of the impeller 2. In this way pollutants in the liquid are forced outwards and towards the rear and outer periphery of the impeller.

In order to eliminate the risk that elongated fibers or other materials are wound around the hub 3, the device has cutting means 8 at the inlet of the socket member 6. The cutting means are here formed as a number of recesses or slots 8 on the outer edge of the socket member 6. The slots cooperate with a number of radial holes 10 in the hub portion 3 and thus provide means for cutting the fibers or other matter.

In order to further increase the possibilities to take away pollutants in the liquid from the sensitive area 11a of seal 5, the hub 3 has surface 9 chamfered away from holes 10, thus diminishing the risks for a collection of pollutants around the slot.

While the present invention has been disclosed, in connection with a preferred embodiment thereof, it should be understood that there may be other embodiments which fall within the spirit and scope of the invention as defined by the following claims.

What is claimed is:

1. In a submersible unit having a housing (11), a shaft (1) rotatably mounted by a bearing (4) in said housing (11), a mechanical seal (5), and an impeller (2) mounted on said shaft (1), the improvement comprising:
    a socket member (6) mounted on said housing (11), said member (6) having internally formed helical grooves (7) and a plurality of cutting slots (8);
    said impeller (2) having a hub portion (3) with externally formed helical grooves (3a) which extend into and are spaced radially inward from said internally formed helical grooves (7); and
    said hub portion (3) having a plurality of circumferentially spaced and radially directed holes (10) positioned to cooperate with said cutting slots (8) for cutting pollutant material.

2. The improvement according to claim 1 including a chamfered surface (9) on said hub portion (3) directed away from said plurality of holes (10) to diminish collection of pollutants material around said holes (10).

3. The improvement according to claim 1 wherein said internally and externally formed grooves (7, 3a) have counter-directed thread profiles so that any pollutant material in the space between said grooves (7, 3a) is directed outward from said housing (11) toward the rear-ward portion of said impeller (2) during rotation.

4. In combiantion with a submersible unit having a housing (11), a shaft (1) rotatably mounted by a bearing (4) in said housing (11), a mechanical seal (5), and an impeller (2) mounted on said shaft (1); wherein the improvement comprises:
- a socket member (6) mounted on said housing (11), said member (6) having internally formed helical grooves (7) and a plurality of cutting slots (8);
- said impeller (2) having a hub portion (3) with externally formed helical grooves (3a) which extend into and are spaced radially inward from said internally formed helical grooves (7);
- said hub portion (3) having a plurality of circumferentially spaced and radially directed holes (10) positioned to cooperate with said cutting slots (8) for cutting pollutant material;
- a chamfered surface (9) on said hub portion (3) directed away from said pluralityof holes (10); and
- said internally and externally formed grooves (7, 3a) have counter-directed thread profiles so that any pollutant material in the space between said grooves (7,3a) is directed toward said chamfered surface (9) and the rear-ward portion of said impeller (2).

* * * * *